United States Patent
Minta et al.

(10) Patent No.: US 11,306,842 B2
(45) Date of Patent: Apr. 19, 2022

(54) ACCV AND A METHOD FOR MANUFACTURING THE SAME

(71) Applicant: Hamilton Sundstrand Corporation, Charlotte, NC (US)

(72) Inventors: Zbigniew Minta, Wrocław (PL); Sergey Mironets, Charlotte, NC (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/384,161

(22) Filed: Apr. 15, 2019

(65) Prior Publication Data

US 2020/0025304 A1    Jan. 23, 2020

(30) Foreign Application Priority Data

Jul. 19, 2018  (EP) .................................... 18461581

(51) Int. Cl.
*F16K 27/00* (2006.01)
*F28F 7/02* (2006.01)
*F16K 49/00* (2006.01)

(52) U.S. Cl.
CPC .............. *F16K 27/00* (2013.01); *F16K 49/00* (2013.01); *F28F 7/02* (2013.01); *F28F 2270/00* (2013.01); *Y10T 137/6416* (2015.04)

(58) Field of Classification Search
CPC ........ F16K 27/00; F16K 49/005; F16K 49/00; F28F 7/02; F28F 2270/00; Y10T 137/6416; Y10T 137/6552
USPC ................................................. 137/340, 339
See application file for complete search history.

(56) References Cited

U.S. PATENT DOCUMENTS

| | | | |
|---|---|---|---|
| 138,562 A * | 5/1873 | Hayes ................... | B01L 3/5025 137/297 |
| 1,727,659 A * | 9/1929 | McBride ............... | F16K 49/005 137/340 |
| 7,874,310 B1 | 1/2011 | Jansen | |
| 9,939,087 B2 | 4/2018 | Kolarski et al. | |
| 2012/0167862 A1 | 7/2012 | Nishimori et al. | |
| 2013/0283815 A1 | 10/2013 | Simpson | |
| 2014/0241854 A1* | 8/2014 | Gekht ..................... | F01D 11/24 415/60 |
| 2016/0208694 A1* | 7/2016 | Simpson ................. | F04B 53/10 |
| 2016/0290164 A1 | 10/2016 | Liebl et al. | |
| 2017/0081250 A1 | 3/2017 | Kamel et al. | |
| 2017/0239723 A1 | 8/2017 | Hoyt et al. | |

(Continued)

FOREIGN PATENT DOCUMENTS

| | | |
|---|---|---|
| CN | 201610943 U | 10/2010 |
| EP | 3159493 A1 | 4/2017 |
| WO | 2013178442 A1 | 12/2013 |

OTHER PUBLICATIONS

Extended European Search Report for International Application No. 18461581.3 dated Oct. 11, 2018, 7 pages.

*Primary Examiner* — Kevin F Murphy
*Assistant Examiner* — Jonathan J Waddy
(74) *Attorney, Agent, or Firm* — Cantor Colburn LLP

(57) ABSTRACT

An active clearance control valve (ACC Valve) includes a valve housing with a thermal shield provided externally to said housing, wherein said valve housing and said thermal shield have been integrally formed as one component. This may be achieved using additive manufacturing methods. Cooling channels and/or ribs may also be provided on or in the thermal shield.

4 Claims, 5 Drawing Sheets

(56) References Cited

U.S. PATENT DOCUMENTS

2019/0316460 A1* 10/2019 Mannas .................. E21B 21/01
2019/0331009 A1* 10/2019 Lee ........................... F01L 3/18

* cited by examiner

ACCV AND A METHOD FOR MANUFACTURING THE SAME

FOREIGN PRIORITY

This application claims priority to European Patent Application No. 18461581.3 filed Jul. 19, 2018, the entire contents of which is incorporated herein by reference.

TECHNICAL FIELD

The examples described herein relate to methods for manufacturing an active clearance control valve (ACC Valve). In particular, the examples described herein relate to methods for manufacturing such valves to improve thermal management of the valves. The examples described herein also relate to an ACC Valve that has been made via these methods.

BACKGROUND

ACC Valves, such as those that are used in gas turbines for aircraft, act to maintain an accurate clearance between the turbine case and a blade tip. These valves are often located at an aircraft engine and the purpose of the ACC Valve is to provide cooling air to reduce clearances at the turbine blade tips and improve turbine efficiency. This is achieved by the ACC Valve mixing hot and cold air from both a compressor exit and a bypass duct in order to provide air at a desired temperature. The air flows through tubes surrounding the casing of the turbine engine and the expansion or contraction of the air around the turbine casing acts to maintain this accurate clearance.

Such ACC Valves are normally covered by a thermal shield to mitigate the risk of the valve contributing to fire susceptibility. The requirement for the ACC Valves is that it should not cause a hazardous condition after being exposed to the flame for a short time period. In addition to this, the thermal shield has to sufficiently protect the electronic elements (e.g. the servo etc.) against any high surrounding temperature.

The thermal shields currently used are made of a heat insulation material such as aluminium foil. Separate pieces of the thermal shield are attached to the ACC Valves by lock wire and capstans.

SUMMARY

An active clearance control valve (ACC Valve) is described herein comprising a valve housing with a thermal shield provided externally to the housing, wherein the valve housing and the thermal shield have been integrally formed as one component.

In some examples, the valve housing and the thermal shield may have been integrally formed via an additive manufacturing method.

In some examples, the thermal shield comprises a rib or ribs provided thereon and/or therein.

In some examples, a first cooling medium channel is provided so as to extend between the valve housing and the thermal shield. In other examples, a plurality of these cooling medium channels are provided so as to extend between the valve housing and the thermal shield.

In some examples, the thermal shield may comprise a rib or ribs provided thereon and/or therein, the ribs thereby forming the first cooling medium channel that extends between the valve housing and the thermal shield.

In some examples, the first cooling medium channel may be provided so as to extend helically between/from, a first end of the valve housing and/to a second end of the valve housing.

In some examples, the first cooling medium channel may be provided so as to extend longitudinally between/from a first end of the valve housing and/to a second end of the valve housing.

In some examples, the rib or ribs may be provided so as to extend helically between/from a first end of the valve housing and/to a second end of the valve housing.

In some examples, the rib or ribs may be provided so as to extend longitudinally between/from a first end of the valve housing and/to a second end of the valve housing.

A method of making this new ACCV is also described, the method comprising integrally forming, as one component, the valve housing and the thermal shield, the shield being provided externally to the housing.

In some examples, the method may comprise integrally forming the valve housing and the thermal shield via an additive manufacturing method.

In some examples, the method may further comprise forming, or printing a rib or ribs onto the thermal shield.

In some examples, the method may further comprise forming a cooling medium channel or channels between the valve housing and the thermal shield.

In some examples, the ribs themselves are what forms the cooling channels.

The method may also comprise forming the ribs and/or channels in a number of configurations, including helical, straight etc. Other shapes and patterns are also envisaged.

The method may further comprise printing a rib or ribs onto the thermal shield via the additive manufacturing method.

The method may further comprise printing the rib or ribs so that they extend longitudinally upon the exterior surface of the thermal shield to thereby create the internal cooling channels.

The valve housing of any of the new examples described herein may be formed from Ti6-4 material.

DETAILED DESCRIPTION

The examples described herein aim to provide an ACC Valve with improved heat dissipation. The valves described herein may be used for air distribution and air flow control. Both require thermal management due to the requirements of operating at high temperatures.

Although applicable to ACCV for any kind of aircraft, the examples described herein may be also utilized in other valves that are configured to air distribution and air flow control. Further, the examples may be used in various types of ACC (Active Clearance Control) valves, such as hydraulic and electric powered, to manage air transportation.

Figure 1:
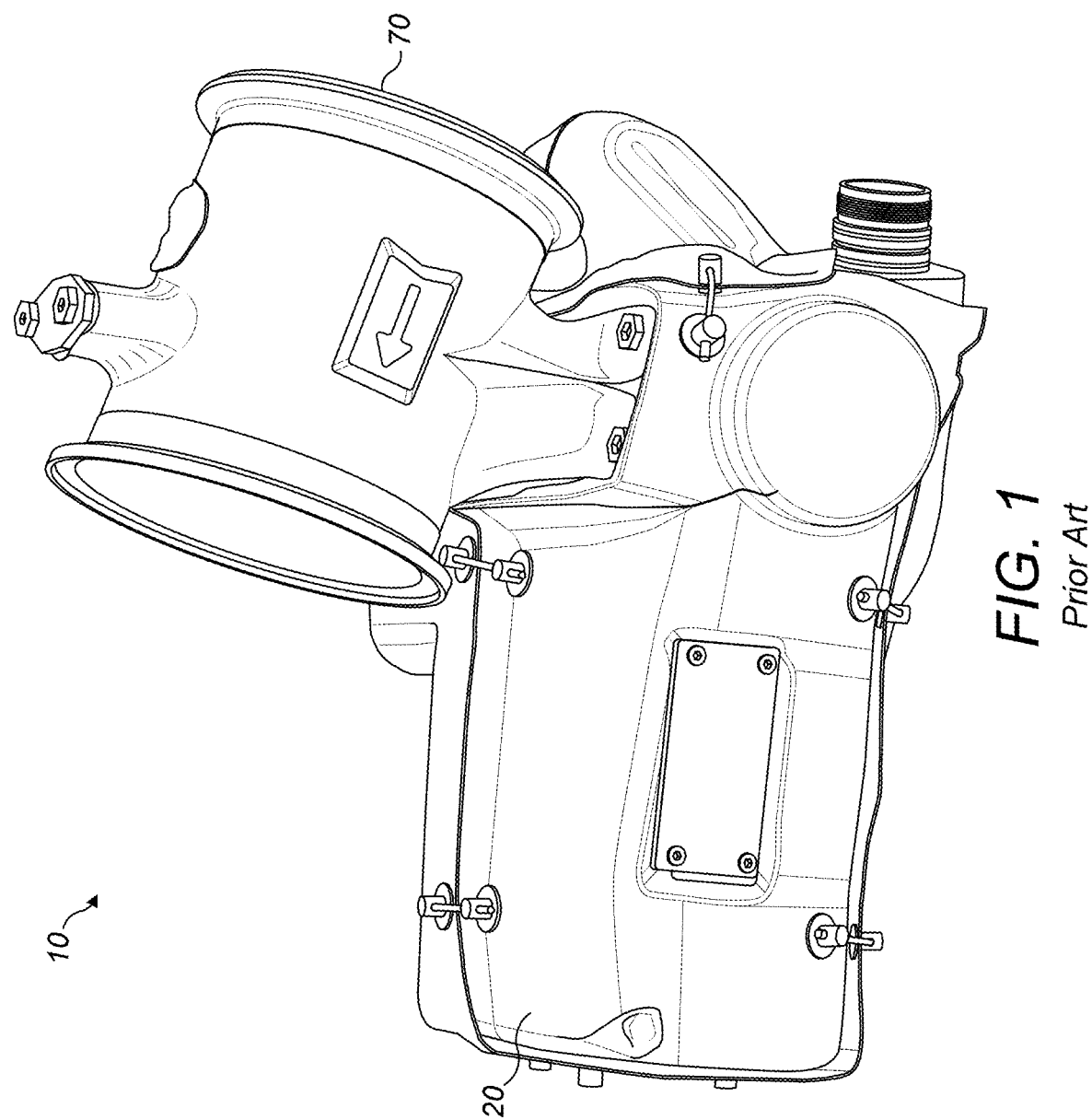
FIG. 1 depicts a known ACC Valve with thermal shield.

The ACC Valve 10 shown in FIG. 1 is a known ACC Valve made by conventional methods. The valve housing 70 is formed and then later covered by a separate layer of material that is wrapped around the valve housing and acts as a thermal shield. Thermal shields 20 that are currently used in ACC Valves are made of a heat insulation material such as aluminium foil. Separate pieces of the thermal shield 20 are attached to the housing of the ACC Valve 10 by suitable means such as lock wire and capstans (not shown).

It would be advantageous, however, if a method of making these ACC Valves could be improved so that costs were reduced, the valves required less overall maintenance and durability of the valve was improved.

The new method and ACC Valves described herein therefore aim to achieve these advantages over known methods to produce a ACC Valves that also have superior qualities in terms of cost, function, weight and ease of maintenance and manufacture.

In the new examples of ACC Valves as described herein, the ACC Valves are made by forming the valve housing and its shield as one component via an additive manufacturing method. The valve housing of any of the new examples described herein may be formed from Ti6-4 material. The shield is formed via additive manufacturing methods so that it is provided externally to the valve housing and in some examples is integrated with the valve housing via ribs. The ACC Valve may also be formed so that a cooling passage or passages is/are provided between the valve housing and the thermal shield. In some examples, these channels are formed via the ribs.

An advantage of using additive manufacturing methods is that it allows for this cooling channel or channels to be provided within an intermediate space that is defined between the outer shield and the inner housing. The cooling channels that are provided within the intermediate space are configured to efficiently reduce the temperature of the valve. Such cooling channels may be used to transport a cooling medium such as air, fluid or other suitable medium. When the cooling medium is air, then the cooling medium may be taken directly from an air distribution system.

Figure 2:
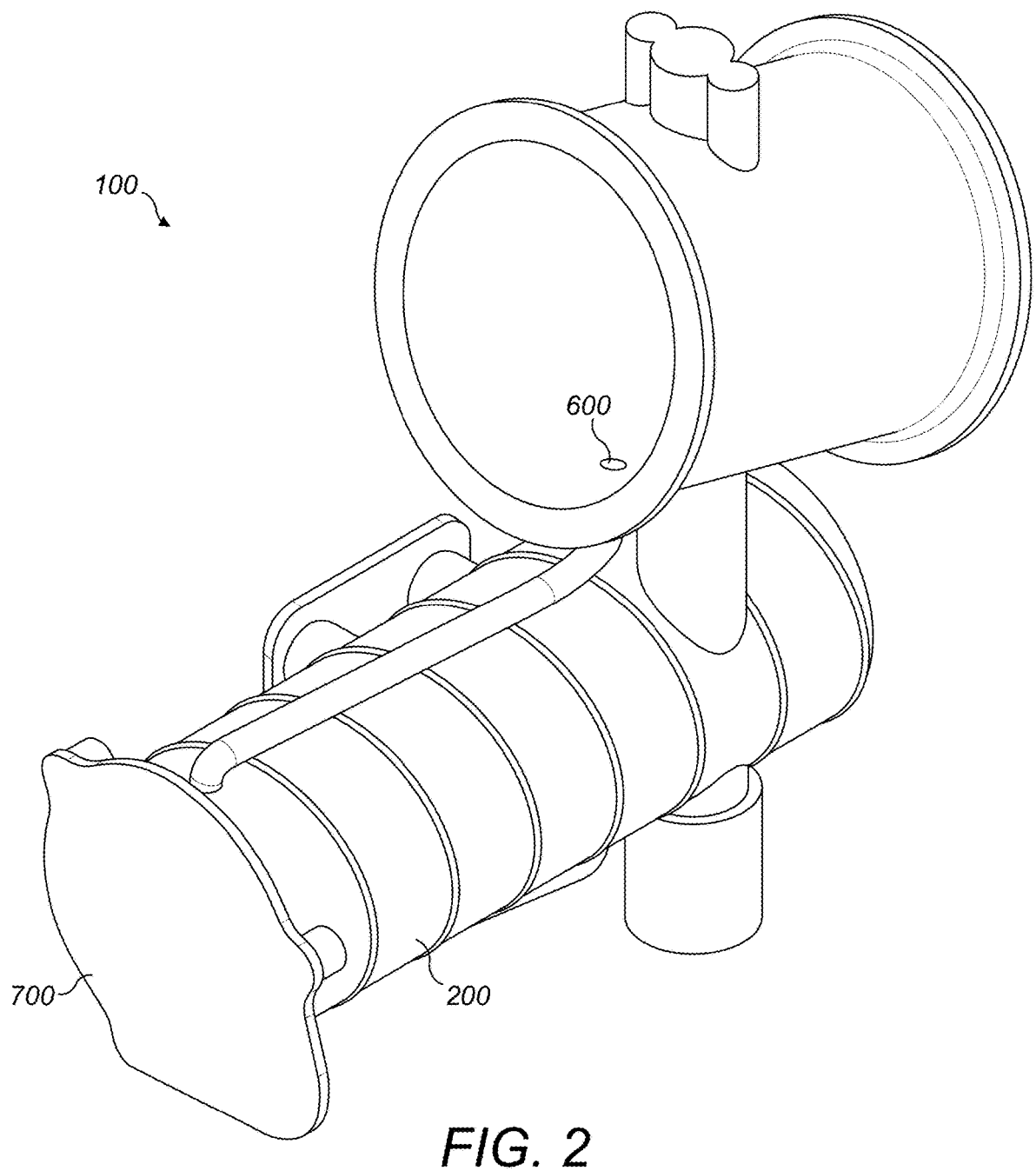
FIG. 2 depicts an example of a new type of ACC Valve as described herein showing the air intake orifice.

For example, FIG. 2 depicts a new type of ACC Valve 100 that has been produced via an additive manufacturing method. The valve 100 has a valve housing 700 (which may in some examples be comprised of both a main valve housing and an actuator housing) and a thermal shield 200 is provided via an additive manufacturing method so that both the housing 700 and the thermal shield 200 are formed integrally as one component.

In some examples, the valve housing 700 and thermal shield 200 may be formed so as to provide a space or spaces between the outer surface of the housing 700 and the inner surface of the surrounding thermal shield 200, as described above. In such examples, and as shown in FIG. 2, the valve 100 may also have a cooling medium inlet orifice 600 that is fluidly connected to this intermediate space between the housing 700 and shield 200 so as to allow the cooling medium to be drawn into the space that is provided between these components. In some examples, the cooling medium is air, or a gas, and in other examples, the cooling medium may be a liquid.

Figure 3:
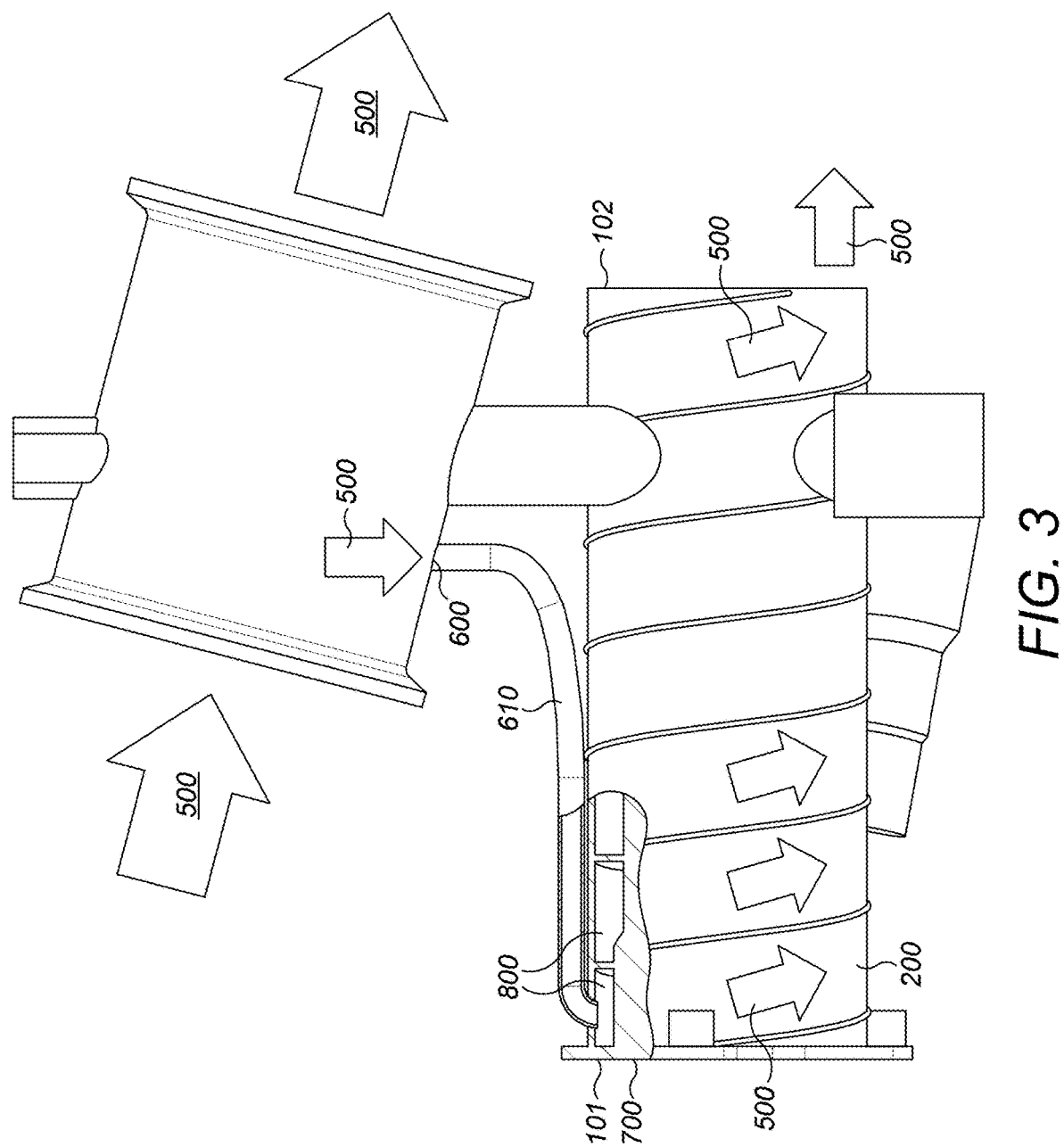
FIG. 3 depicts a side view of the ACC Valve of FIG. 2 showing the movement of air between the valve housing and the thermal shield.

FIG. 3 shows a side view of the ACC Valve 100 of FIG. 2 depicting the movement of the cooling medium 500 as it passed through and into the valve and also into the orifice 600. From there the cooling medium 500 is able to pass into the intermediate space, i.e. the cooling channel(s) 800 that are formed between the outer surface of the valve housing 100 and the inner surface of the thermal shield 200.

As can be seen in FIG. 3, an air cooling channel 800 in this example is connected via a tubing 610 to the air inlet orifice 600. In the example shown in FIG. 3, the cooling channel 800 then extends helically around the outer surface of the valve housing 100 from a first end 10 to a second end 102 of the housing. In some examples, the cooling channels 800 may extend along only part of the full length/outer surface of the valve, and in other examples, the channels may cover the entire surface of the valve housing.

Figure 4:
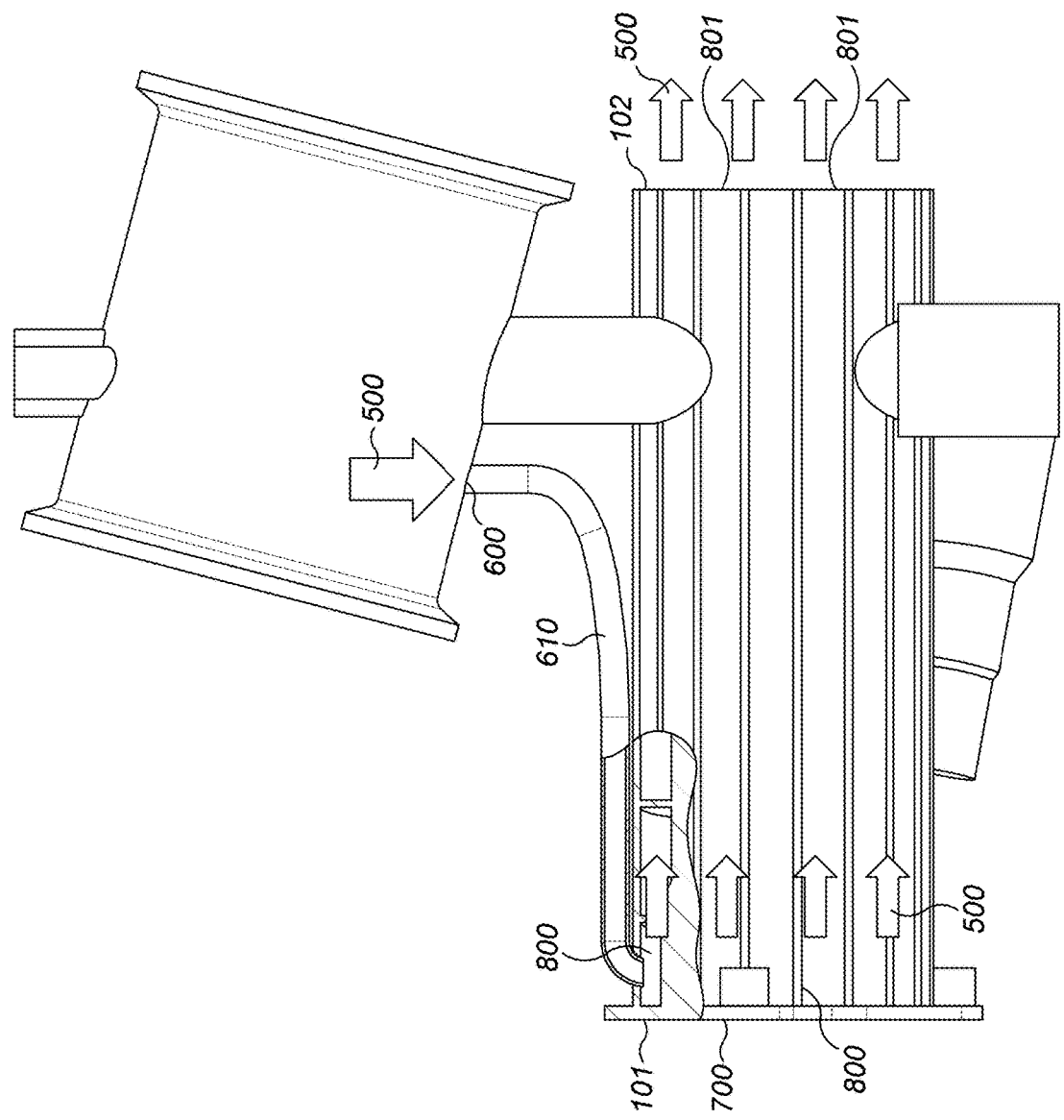
FIG. 4 depicts the air flow through the new ACC Valve.

In the example shown in FIG. 4, the cooling channels 800 extend in a straight line and longitudinally between the first end 101 and the second end 102. That is, as in the example shown in FIG. 3, the cooling medium 500 is able to enter into the cooling channel 800 at the first end 101 of the valve and then flow from the first end 101 to the second end 102, where it exits the channel(s) 800 via the particular configuration of the channel 800 or channels 800. A cooling medium outlet or outlet(s) 801 is/are provided, in this example, at the second end 102 of the valve housing.

Figure 5A:
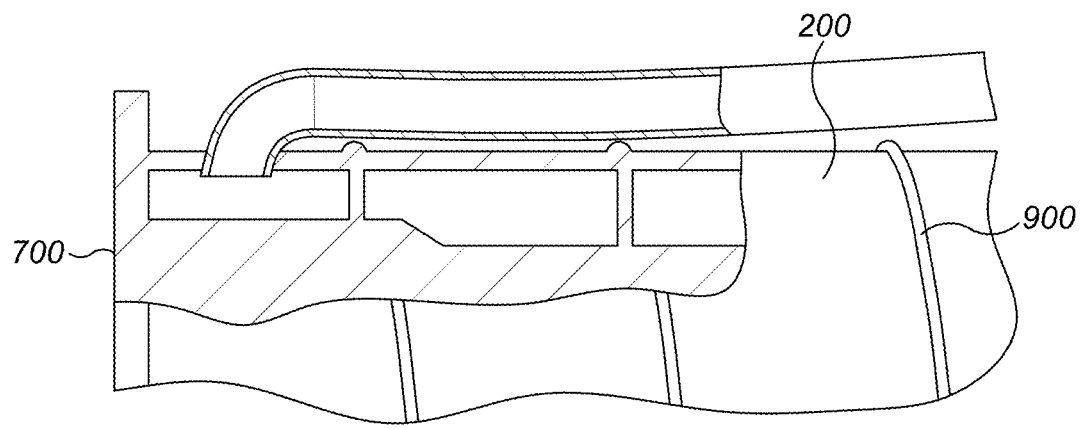
FIG. 5a depicts a cut-away view of a new ACC Valve showing a first rib configuration.
Figure 5B:
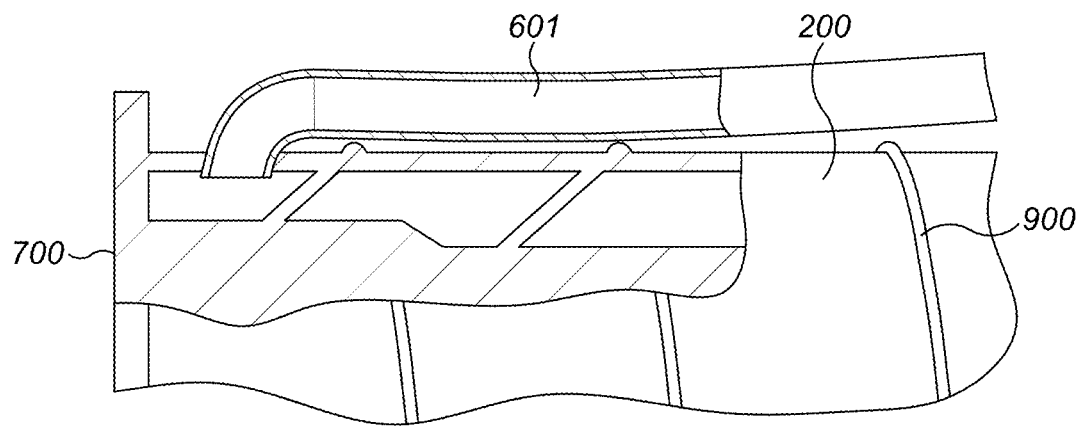
FIG. 5b depicts a cut-away view of a new ACC Valve showing a second rib configuration.

FIGS. 5a and 5b depict cut away views of a valve housing 700 such as that shown in FIGS. 3 and 4 wherein the cooling channels 800 have different internal configurations and shapes. In some examples, the printing may be achieved by printing the in the direction 650 as shown in FIG. 5b.

In some examples, these cooling channels 800 may be formed by printing the thermal shield 200 so as to provide it with ribs 900 as shown in these figures. In some examples, the method may comprise arranging the thermal shield 200 around the external surface of the housing component and printing the ribs 900 onto the thermal shield 200 to thereby form these cooling channels 800 between the valve housing 700 and the thermal shield 200.

In some examples, the ribs' 900 geometry can be extended along the housing component in different ways to create these specific internal cooling channels 800 so that their configuration is provided for maximum cooling efficiency. The main function of the cooling channels 800 is to redirect the cool air taken directly from valve flow. Due to this, the cooling channels 800 will improve the thermal management of ACCV 100.

In addition to this, by providing rigid ribs 900, the overall product durability is improved and external damage is prevented. In the same way as for known ACCVs, the main function of the printed thermal shield 200 is to block and to dissipate the heat, similar to a heat exchanger; however, by printing the shield 200 with these ribs 900, the shield is therefore not only able to protect the valve housing 700 from fire and damage but is also able to facilitate an active cooling by using the airflow (i.e. via the cooling channels 800).

The new method and ACCV described herein uses an additive manufacturing (AM) process for making this new ACCV product 100. Unlike known methods for making ACCVs the method described herein provides an ACC Valve that is integrated with the thermal shield so that it is one printed part that is made of Ti6-4 via an AM process.

Printing the components of the valve and shield as one part provides many benefits in terms of ease of manufacture and costs.

The new method described herein uses an AM to print the thermal shield 200 so that the thermal shield 200 is integrated with the ACCV housing 700.

The method therefore comprises forming an ACC valve housing 700 and a thermal shield 200 via an AM method so that the thermal shield 200 is provided externally to the valve housing 700.

The benefits of manufacturing the new type of ACCV 100 in this way also includes a reduction in manufacturing costs. The fact that the thermal shield 200 is printed together with the housing component as a single part eliminates the need for a separate manufacture of the thermal shield assembly and installation. The new method described herein also results in a reduction in service and maintenance costs, since there is no need for a fire shield disassembly/assembly prior to putting the product back into service. In addition to this, the method results in an ACCV 100 with improved durability, since the rigid printed metallic thermal shield 200 will protect the critical components of the ACCV 100 from excessive heat and external damages. A further advantage is that the overall weight of the ACCV 100 produced via this method is reduced.

In summary, a shielded valve is described herein that provides thermal management for an air distribution system. In particular, the examples described herein provide an ACCV that has improved thermal management of air distribution and control valves, to thereby improve valve protection against high surrounding temperatures and short time exposure to fire.

The invention claimed is:

1. A method of making an active clearance control valve (ACC Valve) for a gas turbine engine comprising:
   integrally forming, as one component, a valve housing and a thermal shield external to said housing; and
   printing one or more ribs onto said thermal shield, said ribs thereby forming a first cooling channel (800) that extends between said valve housing (700) and said thermal shield (200);
   wherein said one or more ribs are printed so as to extend helically between a first end of the valve housing to a second end of the valve housing.

2. The method of claim 1, further comprising forming a plurality of cooling channels between said valve housing and said thermal shield.

3. A method of making an active clearance control valve (ACC Valve) for a gas turbine engine comprising:
   integrally forming via an additive manufacturing method, as one component, a valve housing and a thermal shield external to said housing; and
   printing one or more ribs onto said thermal shield, said ribs thereby forming a first cooling channel that extends between said valve housing and said thermal shield;
   wherein said first cooling channel is provided so as to extend helically between a first end of the valve housing to a second end of the valve housing.

4. An active clearance control valve (ACC Valve) for a gas turbine comprising:
   a valve housing; and
   a thermal shield provided externally to said housing;
   wherein said valve housing and said thermal shield have been integrally formed as one component via an additive manufacturing method;
   wherein said thermal shield comprises one or more ribs provided thereon, said one or more ribs thereby forming a first cooling channel (800) that extends between said valve housing (700) and said thermal shield (200);
   wherein said first cooling channel is provided so as to extend helically between a first end of the valve housing to a second end of the valve housing.

* * * * *